(12) United States Patent
Maeda et al.

(10) Patent No.: US 9,243,309 B2
(45) Date of Patent: Jan. 26, 2016

(54) TI ALLOY AND TI ALLOY MEMBER HAVING ZR AND HF, OR ZR AND NB, OR ZR, HF, AND NB FOR HYDROGEN EMBRITTLEMENT RESISTANCE

(75) Inventors: Takashi Maeda, Osaka (JP); Masanori Takahashi, Osaka (JP); Masaaki Mizuguchi, Joetsu (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 594 days.

(21) Appl. No.: 11/887,952

(22) PCT Filed: Apr. 7, 2006

(86) PCT No.: PCT/JP2006/307428
§ 371 (c)(1),
(2), (4) Date: Oct. 5, 2007

(87) PCT Pub. No.: WO2006/109708
PCT Pub. Date: Oct. 19, 2006

(65) Prior Publication Data
US 2009/0060777 A1    Mar. 5, 2009

(30) Foreign Application Priority Data
Apr. 8, 2005 (JP) .................................. 2005-111605

(51) Int. Cl.
*C22C 14/00* (2006.01)
*C01B 3/00* (2006.01)
*C22F 1/00* (2006.01)
*C22F 1/18* (2006.01)

(52) U.S. Cl.
CPC ............... *C22C 14/00* (2013.01); *C01B 3/0031* (2013.01); *C22F 1/00* (2013.01); *C22F 1/183* (2013.01); *Y02E 60/327* (2013.01)

(58) Field of Classification Search
CPC ........... C22C 14/00; C22F 1/00; C22F 1/183; C01B 3/0031; Y02E 60/327
USPC .......................................... 420/417; 148/421
See application file for complete search history.

(56) References Cited

U.S. PATENT DOCUMENTS

| 4,253,933 A | 3/1981 | Sato et al. |
|---|---|---|
| 2004/0085707 A1* | 5/2004 | Yano et al. .................... 361/302 |

FOREIGN PATENT DOCUMENTS

| JP | 53-12737 | 2/1978 |
|---|---|---|
| JP | 55-38951 | 3/1980 |
| JP | 61-174346 | 8/1986 |
| JP | 62-109936 | 5/1987 |
| JP | 62-199744 | 9/1987 |
| JP | 3-287734 | 12/1991 |
| JP | 4-318137 | 11/1992 |
| JP | 4-365828 | 12/1992 |
| JP | 5-1342 | 1/1993 |
| JP | 6-2175 | 1/1994 |
| JP | 10-88258 | 4/1998 |
| JP | 2003-129152 | 5/2003 |
| JP | 2005-36314 | 2/2005 |
| JP | 2006-89826 | 4/2006 |
| SU | 501095 | 1/1976 |
| WO | 97/29624 | 8/1997 |

OTHER PUBLICATIONS

Yugawa et al., English translation of JP 03-287734A, Dec. 1991, p. 1-14.*
JFE Steel Corporation, "Products Specification JIS H 4600." JFE Steel Corporation, 2007. Web. May 13, 2014.*
L. Lugnikov et al., Binary alloys of titanium-tin and titanium-zirconium systems. Titanium in industry. Collection of articles. Moscow. 'Oborongiz' Publisher, 1961, pp. 31-40.
Binary Alloy Phase Diagrams, pp. 2118, 2120, 3502, 3503, Thaddeus B. Masalski, Editor, copyright 1990.
L. Hakryul, "Corrosion of metals", Publisher: Yeongyeong Pub., ISBN 89-8298-033-9, 1st Ed. Second Print Issue Aug. 22, 2000, p. 286-287.
T. Petrisor et al., "Magnetic Properties of Ti-Zr Alloys", *Journal of Magnetism and Magnetic Materials* 67 (1987) 118-122.
A. Imgram et al., "Tensile Properties of Binary Titanium-Zirconium and Titanium-Hafnium Alloys", *Journal of the Less-Common Metals* 4 (1962) 217-225.
B. Murdoch, "Increasing the Wear Resistance in Water of Titanium Zirconium Alloys by Forming an Oxide Layer on the Surface", Report No. AECL-4358 Atomic Energy Canada Ltd., Chalk River, Ontario, Canada, Dec. 1972.
I. Bashkin et al., "Phase Transformations in Equiatomic Alloy TiZr at Pressure up to 70 kbar", *Physics of the Solid State*, vol. 42, No. 1, 2000, 170-176.
V. Shushkanov, "Investigation of several physical properties of Ti-Zr alloys", *Russian Metallurgy* No. 2, Mar. 1, 1975, 185-188 (translation not required—cited on attached EP Search Report).
J. Blacktop et al., "The α→βTransformation in the Ti-Zr System and the Influence of Additions of Up to 50 at.% Hf", *Journal of the Less-Common Metals*, 109 (1985) 375-380.

* cited by examiner

*Primary Examiner* — Roy King
*Assistant Examiner* — Caitlin Kiechle
(74) *Attorney, Agent, or Firm* — Clark & Brody

(57) ABSTRACT

Disclosed are a Ti alloy having an excellent hydrogen absorption inhibition effect, a Ti alloy member using the Ti alloy, and a manufacturing thereof. A Ti alloy is characterized in that it contains 0.1 to 5.0% by mass in total of at least one of Zr and Hf, and a residue comprising Ti and impurities.

5 Claims, No Drawings

TI ALLOY AND TI ALLOY MEMBER HAVING ZR AND HF, OR ZR AND NB, OR ZR, HF, AND NB FOR HYDROGEN EMBRITTLEMENT RESISTANCE

FIELD OF THE INVENTION

The present invention relates to a Ti alloy and a Ti alloy member using the Ti alloy, as well as a method of manufacturing the same.

BACKGROUND OF THE INVENTION

A Ti alloy is of a light weight and high strength, as well as being excellent in corrosion resistance, as compared with a metallic material such as iron or its alloy. Therefore, the Ti alloy is broadly used as a pipe material, a plate material or a wire material, or as a Ti alloy member produced by secondary working using these materials, for sport and leisure equipments, medical implements, various plant parts and members, and aerospace equipments.

In the meantime, it is known that a metallic material is corroded in an acid solution, and causes hydrogen-embrittlement phenomena by absorbing hydrogen when hydrogen exists therearound at a hydrogen absorbing potential. A Ti alloy, as well as steal, aluminium alloy, copper alloy and nickel alloy are known as metals that are easy to cause hydrogen-embrittlement.

The hydrogen-embrittlement may not only shorten the life of the Ti alloy member in the above field of use of the Ti alloy, but also cause a phenomenon, such as stress corrosion cracking.

In order to address the above, there are hitherto known a method that inhibits hydrogen from being absorbed into the inside of a Ti alloy member by the condition of the forming process, such as surface treatment, of the Ti alloy member, and a method that inhibits the absorption of hydrogen by the composition of a Ti alloy.

As the former method, Patent Document 1 describes that a surface of a Ti alloy member is polished and then an oxide film is formed thereon. Patent Document 2 describes that when forming a Ti alloy member, titanium carbide, titanium nitride or titanium carbonitride is prevented from being formed on a surface thereof. Patent Document 3 describes that a Ti alloy member is formed so as to form an acicular a structure having a given aspect ratio.

As the latter method, Patent Document 4 and Patent Document 5 describe that absorption of hydrogen of a Ti alloy is inhibited by containing a given amount of Al in Ti.

However, none of these methods can produce a satisfactory effect to inhibit a Ti alloy from absorbing hydrogen, and therefore a conventional Ti alloy may cause hydrogen-embrittlement by absorbing hydrogen.

Patent Document 1: Japanese Patent Application Laid-open No. Sho-53-12737
Patent Document 2: Japanese Patent Application Laid-open No. Hei-6-2175
Patent Document 3: Japanese Patent Application Laid-open No. Hei-10-88258
Patent Document 4: Japanese Patent Application Laid-open No. 2003-129152
Patent Document 5: Japanese Patent Application Laid-open No. 2005-36314

SUMMARY OF THE INVENTION

Problems to be Solved by the Invention

It is an object of the present invention to provide a Ti alloy having an excellent hydrogen absorption inhibition effect, and a Ti alloy member using the Ti alloy, as well as a method of manufacturing the same.

Means to Solve the Problems

The present inventors intensively studied on the hydrogen absorption characteristics of a Ti alloy, found that a Ti alloy can produce an excellent hydrogen absorption inhibition effect when a predetermined amount of any one of Zr and Hf is contained in Ti, and thus achieved the present invention.

Specifically, in order to solve the above problem, a Ti alloy of claim 1 is characterized in that it contains 0.1 to 5.0% by mass in total of at least one of Zr and Hf, and a residue comprising Ti and impurities. The invention of claim 2 is characterized in that a Ti alloy contains 0.1 to 5.0% by mass in total of at least one of Zr and Hf, not more than 5.0% by mass in total of at least one of Nb and Ta, and a residue comprising Ti and impurities. The invention of claim 3 is characterized in that a Ti alloy contains 0.1 to 5.0% by mass in total of at least one of Zr and Hf, not more than 0.12% by mass in total of at least one of platinum group elements, and a residue comprising Ti and impurities. The invention of claim 4 is characterized in that a Ti alloy contains 0.1 to 5.0% by mass in total of at least one of Zr and Hf, not more than 5.0% by mass in total of at least one of Nb and Ta, not more than 0.12% by mass in total of at least one of platinum group elements, and a residue comprising Ti and impurities.

The invention of claim 5 relating to a titanium alloy member is characterized in that the Ti alloy of any one of claims 1 to 4 is used therein. The invention of claim 6 is characterized in that the Ti alloy member is manufactured by being annealed in a single-phase region.

The invention of claim 7 relating to a method of manufacturing the Ti alloy member is characterized in that it comprises manufacturing an ingot using the Ti alloy of any one of claims 1 to 4, shaping the ingot by at least one of hot working and cold working, and annealing the shaped intermediate in a single-phase region.

Advantages of the Invention

According to the present invention, in which the Ti alloy contains 0.1 to 5.0% by mass in total of at least one of Zr and Hf, it is possible to inhibit a Ti alloy from absorbing hydrogen and hence allow a Ti alloy and a Ti alloy member using the Ti alloy to have an excellent effect of inhibiting hydrogen absorption.

DETAILED DESCRIPTION OF THE PREFERRED EMBODIMENT

Now, the description will be made for a preferred embodiment of the present invention, and more particularly a Ti alloy of this embodiment.

A Ti alloy of this embodiment contains 0.1 to 5.0% by mass in total of at least one of Zr and Hf, 0 to 5.0% by mass in total of at least one of Nb and Ta, 0 to 0.12% by mass in total of a platinum group element, and a residue comprising Ti and impurities.

The at least one of Zr and Hf is an essential component of the titanium alloy of the present invention, and 0.1 to 5.0% by mass in total thereof is contained in the titanium alloy for the reason that when the content thereof is less than 0.1% by mass in total thereof, a satisfactory effect of inhibiting hydrogen absorption cannot be produced, and when the content thereof is more than 5.0% by mass in total thereof, the lightweight (low specific gravity) characteristic may be deteriorated.

From the above point of view, it is preferable that 0.5 to 3.0% by mass in total of at least one of Zr and Hf is contained in a Ti alloy.

Since Zr is an element that forms a continuous solid solution with Ti, and therefore even if the content thereof is increased, it is possible to prevent the δ phase from being formed in a microstructure and produce excellent workability. Since Zr is generally cheaper than Hf, a titanium alloy containing Zr may be able to be provided at a lower cost than a titanium alloy containing Hf. From these points of view, it is preferable to use Zr rather than Hf for a Ti alloy.

The at least one of Nb and Ta is an optional component of the titanium alloy of the present invention. If a Ti alloy contains these components along with the Zr and the Hf, the Ti alloy can have a more excellent hydrogen absorption inhibition effect and an improved corrosion resistance than a Ti alloy containing only Zr and Hf.

0 to 5.0% by mass in total of at least one of Nb and Ta is contained in the Ti alloy of this embodiment for the reason that even if the content thereof exceeds 5% by mass in total, it is difficult to obtain further improved hydrogen absorption inhibition effect and corrosion resistance, and a Ti alloy does not have an a single-phase structure but a two phase structure with a B phase formed therein and the presence of the B phase invites hydrogen absorption so that the Ti alloy may not have a satisfactory hydrogen absorption inhibition effect.

When the Ti alloy has a two phase structure, this structure is easy to be an inhomogeneous structure, which may cause inhomogeneous distribution of Nb and Ta and hence deteriorate the homogeneity of the surface. Since Nb and Ta are metals having a melting point higher than Ti and therefore as the content thereof is increased, it is easy to form segregation or a second phase when an ingot of a titanium alloy is manufactured by a melting process.

From those points of view, it is preferable that 0.5 to 3.0% by mass in total of at least one of Nb and Ta is contained in a Ti alloy.

Furthermore, since Nb is generally cheaper than Ta, a titanium alloy containing Nb may be able to be provided at a lower cost than a titanium alloy containing Ta. From this point of view, it is preferable to use Nb rather than Ta for a Ti alloy.

The platinum group elements are optional components of a titanium alloy of the present invention. If a Ti alloy contains these platinum group elements along with the Zr and Hf, the Ti alloy can have more excellent hydrogen absorption inhibition effect and improved corrosion resistance than a Ti alloy containing only Zr and Hf.

As the platinum group elements of this embodiment, it is possible to use Ru, Rh, Pd, Os, Ir and Pt. These may be contained in a Ti alloy solely or in combination with each other.

0 to 0.12% by mass in total of the platinum group elements is contained in a Ti alloy for the reason that even if the content exceeds 0.12% by mass in total, it is difficult to obtain further improved hydrogen absorption inhibition effect and corrosion resistance. Furthermore, since the platinum group elements are generally more expensive than Hf, Zr, Nb, Ta and the like, it is preferable that 0.02 to 0.1% by mass in total of the platinum group elements are contained in a Ti alloy in order to reduce the cost increase of a Ti alloy while maintaining excellent hydrogen absorption inhibition effect and corrosion resistance.

As the impurities, it can be cited impurities generally contained in Ti for industrial use, such as O, H, N and Fe. The content of these impurities is set to be equivalent to that of pure titanium of 4 grade and preferably 2 grade according to JIS H 4600. As the other impurities, minor elements may be contained to such an extent as not to deteriorate advantages of the present invention. As the kinds of the minor elements, it can be cited V, Mo, W, Cr, Ni, Co, Cu, Sn, Al and the like. These minor elements each are usually contained in the amount of not more than 0.5% by weight.

Now, the description will be made for a method of manufacturing a Ti alloy member using the aforesaid Ti alloy. First, an ingot of a Ti alloy is prepared by a melting method, and this ingot is shaped and then annealed in a single-phase region. Thus, a Ti alloy member is manufactured.

As the melting method for preparing the ingot, a consumable-electrode arc melting method, an electron beam melting method or the like may be employed. As the shaping method for this ingot, hot or cold forging, extrusion or rolling may be employed. The shaped ingot may be further annealed in a single-phase region so that it is possible to inhibit the Ti alloy member from having a two phase structure and suppress the deterioration of the hydrogen absorption inhibition effect of the Ti alloy member.

In the manufacturing method of the Ti alloy member, it is possible to manufacture the Ti alloy member in the form of a tube material, a plate material or a wire material, or into any other forms by secondary working using these materials.

Furthermore, since the Ti alloy member has excellent corrosion resistance and hydrogen absorption inhibition effect (an effect of preventing hydrogen-embrittlement), it can be appropriately used in a chemical plant, such as oil refinery and metal refinery, or for a negative electrode material of an electrolytic device for such as soda electrolysis and electrocrystallization.

EXAMPLES

Now, the description will be made for the present invention with reference to examples without intention to limit the present invention thereto.

Examples 1 to 18

Comparative Examples 1 to 3

Preparation of Test Pieces 500 g of an ingot of a Ti alloy of each of Examples 1 to 18 and Comparative Examples 1 to 2 with the respective components contained therein as shown in Table 1, and Comparative Example 3 with pure titanium of 1 grade of JIS used therein were prepared by Ar arc-melting. Each ingot was heated to 1100° C., and hot rolled to a thickness of 5 mm, and then cold rolled to a thickness of 2 mm, and then annealed at 700° C. Thus, plate materials were prepared.

Plate pieces each having a thickness of 2 mm, a width of 20 mm and a length of 40 mm was cut out from the respective plate materials, and one surface of each of the plate pieces was polished with #600, and then a portion other than the polished surface was insulated with silicone sealant. Thus, test pieces for measuring the hydrogen absorption amount were prepared.

Likewise, plate pieces each having a thickness of 2 mm, a width of 20 mm and a length of 40 mm were cut out from the respective plate materials, and the entire surface of each plate piece was polished with #600 (not insulated with silicone sealant). Thus, test pieces for corrosion resistance test were prepared.

Furthermore, plate pieces each having a thickness of 2 mm, a width of 15 mm and a length of 15 mm were cut out from the respective plate materials, were polished with #1000, and then were mirror polished. Thus, test pieces for structure observation were prepared.

The impurities contents of these Examples and Comparative Examples were measured and found to be equivalent to each other, and specifically Fe: about 0.02%, O: about 0.05%, H: 0.0002%, C: 0.005% and N: 0.002% by weight.

TABLE 1

| | Composition (weight %) | | | | | | | | | |
|---|---|---|---|---|---|---|---|---|---|---|
| | Zr | Hf | Nb | Ta | Ru | Rh | Pd | Os | Ir | Pt |
| Example 1 | 0.28 | | | | | | | | | |
| Example 2 | | 0.29 | | | | | | | | |
| Example 3 | 1.48 | | | | | | | | | |
| Example 4 | 3.11 | | | | | | | | | |
| Example 5 | 3.07 | | 0.51 | | | | | | | |
| Example 6 | | 1.47 | | | | | | | | |
| Example 7 | 1.03 | 0.98 | | | | | | | | |
| Example 8 | 1.02 | | 1.55 | | | | | | | |
| Example 9 | 0.99 | | 2.54 | | | | | | | |
| Example 10 | 0.98 | | 1.51 | 0.97 | | | | | | |
| Example 11 | 0.51 | 0.51 | 2.04 | 0.48 | | | | | | |
| Example 12 | 1.01 | | | | 0.045 | | | | | |
| Example 13 | 1.03 | | | | | 0.049 | | | | |
| Example 14 | 1.02 | | 2.49 | | | | 0.051 | | | |
| Example 15 | 1.00 | | 2.47 | | | | | 0.045 | | |
| Example 16 | 0.49 | 0.48 | 2.46 | | | | | | 0.046 | |
| Example 17 | 1.02 | | 1.99 | 0.50 | | | | | | 0.047 |
| Example 18 | 1.52 | | 1.98 | | 0.023 | | 0.026 | | | |
| Comparative Example 1 | 0.08 | | | | | | | | | |
| Comparative Example 2 | | 0.07 | | | | | | | | |
| Comparative Example 3 | JIS Pure Titanium of 1 Grade | | | | | | | | | |

(Evaluation)

(Hydrogen Absorption Amount)

The test pieces of the Examples and the Comparative Examples each were charged with −500 A/m$^2$, and cathode-electrolyzed in an aqueous solution of 1N sulfuric acid at 40° C. for 4 hours.

The absorbed hydrogen amounts (mass %) of the test pieces were measured before and after this test following the method of determining the absorbed hydrogen amount described below, and the differences were designated as the hydrogen absorption amounts. The result is shown in Table 2.

<Method of Determining the Absorbed Hydrogen Amount>

(1) Adjustment of Measuring Specimens

Test pieces having a thickness of 1.0 mm (from a hydrogen absorption surface), a width of 3 mm and a length of 30 mm each were cut out and adjusted to have a weight of 0.30 g.

(2) Measuring Absorbed Hydrogen Amounts

The absorbed hydrogen amounts are measured by an inert gas fusion-gaschromatograph method described in a "Hydrogen analyzing method of titanium and titanium alloy" of JIS H 1619.

(Corrosion Resistance 1: Sulfuric Acid Corrosion Test)

The test pieces of the respective Examples and Comparative Examples are retained for 24 hours in a 1% solution of sulfuric acid at 60° C., and the mass variation between the initial mass and the mass after the test is measured. This mass variation is divided by the surface area of the test piece and the immersion time of sulfuric acid (24) to determine the corrosion rate (corrosion resistance). The result is shown in Table 2.

TABLE 2

| | Corrosion Rate (g/m$^2$/h) | Hydrogen Absorption Amount (%) |
|---|---|---|
| Example 1 | 0.524 | 0.042 |
| Example 2 | 0.477 | 0.039 |
| Example 3 | 0.085 | 0.019 |
| Example 4 | 0.070 | 0.016 |
| Example 5 | 0.067 | 0.015 |
| Example 6 | 0.078 | 0.017 |
| Example 7 | 0.075 | 0.018 |
| Example 8 | 0.05 or less | 0.015 |
| Example 9 | 0.05 or less | 0.013 |
| Example 10 | 0.05 or less | 0.013 |
| Example 11 | 0.05 or less | 0.014 |
| Example 12 | 0.05 or less | 0.022 |
| Example 13 | 0.05 or less | 0.024 |
| Example 14 | 0.05 or less | 0.014 |
| Example 15 | 0.05 or less | 0.013 |
| Example 16 | 0.05 or less | 0.010 |
| Example 17 | 0.05 or less | 0.012 |
| Example 18 | 0.05 or less | 0.014 |
| Comp. Example 1 | 0.830 | 0.054 |
| Comp. Example 2 | 0.822 | 0.052 |
| Comp. Example 3 | 0.826 | 0.056 |

From the result of this Table 2, it is found that containing 0.1 to 5.0% by mass in total of at least one of Zr and Hf in a titanium alloy enables a Ti alloy to inhibit hydrogen absorption, and a Ti alloy and a Ti alloy member using the Ti alloy to have an excellent hydrogen absorption inhibition effect. Furthermore, it is found that containing at least one of Nb and Ta along with at least one of Zr and Hf enables a Ti alloy to inhibit the hydrogen absorption and have an improved corrosion resistance. Still furthermore, it is found that containing a platinum group element along with at least one of Zr and Hf enables a Ti alloy to inhibit hydrogen absorption and have an improved corrosion resistance.

(Corrosion Resistance 2: Hydrochloric Acid Corrosion Test)

By using the test pieces for corrosion resistance of Example 14 and Comparative Example 3, they are immersed in 1% hydrochloric acid, 3% hydrochloric acid and 5% hydrochloric acid, respectively at 60° C. for 24 hours, and the mass variation between the initial mass and the mass after the test is measured. This mass variation is divided by the surface area of the test piece and the immersion time of hydrochloric acid (24) to determine the corrosion rate (corrosion resistance). The result is shown in Table 3.

TABLE 3

| | Corrosion Rate in Hydrochloric Acid (g/m$^2$/h) | | |
|---|---|---|---|
| | 1% Hydrochloric Acid | 3% Hydrochloric Acid | 5% Hydrochloric Acid |
| Example 14 | 0.05 or less | 0.41 | 0.68 |
| Comp. Example 3 | 0.05 or less | 0.66 | 0.90 |

From the result of this Table 3, it is found that the Ti alloy of Example 14 has an improved corrosion resistance against hydrochloric acid as compared with a pure titanium of Comparative Example 3.

(Practical-Use Simulation Test: Hydrogen Absorption Test by Hydrogen Sulfide)

Measuring of a hydrogen absorption amount by hydrogen sulfide gas, simulating use in an oil refinery, was carried out. Each of the test pieces of Example 14 and Comparative Example 3 and a test liquid are placed in a test container to have a ratio of the liquid of 50 cc/cm$^2$ relative to the surface area of the test piece, and an atmospheric exposure test was carried out for 8760 hours at 200° C. using an autoclave machine, in which the test liquid is made of water, H$_2$S and Cl$^-$ and adjusted to have H$_2$S: 5% and Cl$^-$: 1000 ppm relative to the water. The result is shown in Table 4.

TABLE 4

| | Hydrogen Absorption Amount (%) by Hydrogen Sulfide |
|---|---|
| Example 14 | 0.023 |
| Comparative Example 3 | 0.055 |

From the Table 4, it is found that the hydrogen absorption amount by hydrogen sulfide for the Ti alloy of Example 14 is still low as compared with the pure titanium of Comparative Example 3, and therefore the Ti alloy of Example 14 can be appropriately used in an oil refinery or the like.

(Structure Observation)

A polished surface of the test piece for structure observation of each of the Examples was etched with an etching solution of nitric-hydrofluoric acid and the structure was observed by an optical microscope. As a result, an a single-phase structure was observed in any of the Examples, and from this observation result, it is found that it is possible to inhibit the formation of a B phase in a Ti alloy member and suppress the deterioration of the hydrogen absorption inhibition effect of a Ti alloy member, by having the Ti alloy member annealed and manufactured in a single-phase region.

The invention claimed is:

1. A Ti alloy having resistance to hydrogen embrittlement consisting of Zr, Hf, and a residue consisting of Ti and impurities, in which the total content of Zr and Hf is 2.01 to 5.0% by mass.

2. A Ti alloy member characterized in that the Ti alloy having resistance to hydrogen embrittlement of claim 1 is used therein.

3. The Ti alloy member according to claim 2, wherein the Ti alloy member is manufactured by being annealed in a single-phase region.

4. A Ti alloy having resistance to hydrogen embrittlement consisting of Zr, Nb, and a residue consisting of Ti and impurities, in which the content of Zr is 0.1 to 5.0% by mass, and Nb is present in an amount not more than 5.0% by mass.

5. A Ti alloy having resistance to hydrogen embrittlement consisting of Zr, Hf, Nb, and a residue consisting of Ti and impurities, in which the content of Zr and Hf is 0.1 to 5.0% by mass, and Nb is present in an amount not more than 5.0% by mass.

* * * * *